United States Patent [19]

Willey

[11] Patent Number: 5,023,141
[45] Date of Patent: Jun. 11, 1991

[54] HIGH SOLIDS PRIMER COMPOSITION
[75] Inventor: Monroe M. Willey, Media, Pa.
[73] Assignee: E. I. Du Pont de Nemours and Company, Wilmington, Del.
[21] Appl. No.: 384,811
[22] Filed: Jul. 25, 1989
[51] Int. Cl.$^5$ .................. B32B 15/08; B32B 27/08; B32B 27/36; C08F 20/00
[52] U.S. Cl. .................. 428/458; 428/480; 428/483; 525/418; 525/443
[58] Field of Search .......... 428/337, 424.4, 423.7, 428/480, 483, 458; 524/598; 525/438, 418, 443; 430/295

[56] References Cited

U.S. PATENT DOCUMENTS

| | | | |
|---|---|---|---|
| 3,994,851 | 11/1976 | Chang | 524/598 |
| 4,113,487 | 9/1978 | Matsunaga et al. | 430/295 |
| 4,205,115 | 5/1980 | Piccirilli et al. | 428/334 |
| 4,232,090 | 11/1980 | Simon | 428/424.4 |
| 4,535,328 | 8/1985 | Ambrose et al. | 525/443 |
| 4,714,743 | 12/1987 | Kordomenos et al. | 525/418 |
| 4,740,426 | 4/1988 | Tremper, III | 428/423.7 |
| 4,752,532 | 6/1988 | Starka | 428/482 |
| 4,816,528 | 3/1989 | Dervan et al. | 525/438 |

*Primary Examiner*—Thomas J. Herbert
*Attorney, Agent, or Firm*—Hilmar L. Fricke

[57] ABSTRACT

A primer composition having a low VOC content and containing solvents, a film forming binder and pigments and the binder contains about (1) 30-65% by weight, based on the weight of the binder, of a hydroxyl containing polyester copolymer having a hydroxy number of about 100-300 and a number average molecular weight of about 300-3,000 and being the esterification product of an alkylene glycol, a branched chain polyol, a cycloaliphatic dicarboxylic acid, an aliphatic dicarboxylic acid and an aromatic dicarboxylic acid or anhydride thereof;

(2) 5-20% by weight, based on the weight of the binder, of a reactive plasticizer; and (3) 30-50% by weight, based on the weight of the binder, of a monomeric fully alkylated melamine formaldehyde crosslinking agent.

10 Claims, No Drawings

HIGH SOLIDS PRIMER COMPOSITION

BACKGROUND OF THE INVENTION

This invention is directed to a primer composition and in particular to a high solids primer having a low VOC content (volatile organic content) primarily useful for automobiles and trucks.

Primer compositions are well known in the art and are widely used in the manufacture of automobiles and trucks as shown in Simon U.S. Pat. No. 4,232,090 issued Nov. 4, 1980. High solids polyester coating compositions also are well known as shown in Chang U.S. Pat. No. 3,994,851 issued Nov. 30, 1976. Polyester copolymer coating compositions are shown in Piccirilli et al U.S. Pat. 4,205,115 issued May 27, 1980 and in Ambrose et al U.S. Pat. No. 4,535,132 issued Aug. 13, 1985. However, none of these compositions meet the current needs of modern automotive and truck manufacturing plants which require high solids compositions that have a low VOC but have excellent physical properties such as corrosion resistance and a high level of adhesion to primed and unprimed metal substrates, primed and unprimed plastic substrastes and provide a surface to which conventional topcoats will adhere.

SUMMARY OF THE INVENTION

A primer composition containing solvents and about 50-85% by weight of a film forming binder and pigments in a pigment to binder weight ratio of about 1:100-150:100; and the binder contains about (1) 30-65% by weight, based on the weight of the binder, of a hydroxyl containing polyester copolymer having a hydroxyl number of about 100-300 and a number average molecular weight of about 300-3,000 and being the esterification product of an alkylene glycol, a branched chain polyol, a cycloaliphatic dicarboxylic acid, an aliphatic dicarboxylic acid and an aromatic dicarboxylic acid or anhydride thereof;

(2) 5-20% by weight, based on the weight of the binder, of a reactive plasticizer; and (3) 30-50% by weight, based on the weight of the binder, of a monomeric fully alkylated melamine formaldehyde crosslinking agent.

DETAILED DESCRIPTION OF THE INVENTION

The primer composition has a low VOC content (volatile organic content), can be formulated into a light colored composition, forms finishes that are hard, have excellent adhesion to a variety of substrates such as cold rolled steel, phosphatized steel, phosphatized steel primed with a primer applied by electrocoating, plastic substrates which may be primed or unprimed such as polyester reinforced fiber glass, reaction injection molded urethanes, partially crystalline polyamides and other plastic substrates and provides a surface to which conventional topcoats will adhere.

The primer composition is particularly useful on the aforementioned substrates since it can be used as a surfacer to cover imperfections in surfaces of primed metal and plastic substrates. For example, electrocoating of metal substrates with a primer often results in a finish that has small imperfections and this composition can be applied to form a smooth, glossy finish that is free from imperfections. Also, plastic substrates such as SCM (sheet molding compound) which is a polyester reinforced with fiber glass contains many surface imperfections and must be coated with a surfacer. By increasing the pigmentation used in the composition, an easily sandable finish is formed that covers imperfections and can be sanded to a smooth finish which is then topcoated with conventional acylic enamel finishes.

A corrosion resistant primer for metal substrates can be formed by replacing about 5-15% by weight of the polyester of the binder with an epoxy resin such as "Epon" 828 or 1001.

The primer composition has a film forming binder content of about 50-85% by weight and correspondingly about 15-50% by weight of a liquid carrier which usually is a solvent for the binder.

The film forming binder of the composition contains about 30-65% by weight of a polyester copolymer, about 5-20% by weight of castor oil and about 30-50% by weight of the monomeric fully alkylated melamine formaldehyde crosslinking agent. One preferred composition contains about 35-45% by weight of the polyester copolymer, 5-20% by weight of castor oil and 40-50% by weight of the crosslinking agent are used and forms a high quality composition.

The hydroxyl containing polyester copolymer used in the composition has a hydroxyl number of about 100-300 and a Mn (number average molecular weight) of about 300-3,000 and is the esterification product of an alkylene glycol, a branched polyol, a cycloaliphatic dicarboxylic acid, an aliphatic dicarboxylic acid and an aromatic dicarboxylic acid or anhydride thereof.

Molecular weight is determined by gel permeation chromatography using polymethyl methacrylate as the standard.

Typical alkylene glycols or diols that are useful for forming the polyester have from 2-10 carbon atoms and are for example ethylene glycol, propylene glycol, butane diol, pentane diol, neopentyl glycol, hexane diol, octane diol, Esterdiol 204 (a commercial diol produced by Union Carbide) and the like. One preferred gylcol is neopentyl glycol since it forms a high quality polyester.

Typical branched chain polyols that can be used are trimethylolpropane, triethylolpropane, pentaerythritol and the like. One preferred branched chain polyol is trimethylolpropane.

Typical cycloaliphatic dicarboxylic acids that can be used are alkyl cyclohexyl dicarboxylate such as dimethyl cyclohexyl dicarboxylate.

Typical aliphatic dicarboxylic acids that can be used are adipic acid, azelaic acid, succinic acid, glutaric acid, pimelic acid, suberic acid, and the like.

Typical aromatic dicarboxylic acids that can be used are phthalic acid, orthophthalic acid, isophthalic acid and the like.

Typical anhydrides that can be used are orthophthalic anhydride, succinic anhydride, glutaric anhydride and the like.

One preferred polyester copolymer is the esterification product of neopentyl gylcol, trimethylolpropane, dimethyl cyclohexyl dicarboxylate, adipic acid and isophthalic acid having an acid no. of about 5-20, a hydroxyl no. of about 150-200 and a Mn of about 1000-2200.

The polyester copolymer is prepared by conventional esterification procedures in which the components are charged into a polymerization vessel with solvents and usually a esterification catalyst and heated to about 100°-200° C. for about 30 minutes to 5 hours with removal of water that is formed during the process.

Castor oil is used as a reactive plasticizer. Other reactive plasticizers can be used such as polycaprolactone.

The crosslinking agent used in the composition is a monomeric fully alkylated melamine formaldehyde crosslinking agent. Preferably, the crosslinking agent is a monomeric butylated and methylated melamine formaldehyde, butylated and methylated in a 1:1 molar ratio. One commercially available agent of this type is "Resimine" 755.

Typical pigments that can be used in the composition are filler pigments such as talc, china clay, barytes, carbonates, silicates, metallic oxides such as titanium dioxide, zinc oxide and iron oxide and carbon black and organic colored pigments and dyes. The resulting primer composition has a pigment to binder weight ratio of about 1:100-150:100.

The pigments can be introduced into the primer composition by first forming a mill base with the polyester copolymer or with another compatible polymer or dispersant by conventional techniques such as sand grinding, ball milling or attritor grinding. The mill base is blended with other constituents used in the composition.

Any of the conventional solvents or blends of solvents can be used to form the primer composition provided that the selection of solvents is such that the polymeric binder constituents are compatible and give a high quality primer. The following are examples of solvents that can be used to prepare the composition: methyl ethyl ketone, methyl amyl ketone, methyl isobutyl ketone, toluene, xylene, acetone, ethylene glycol monobutyl ether acetate and other esters, ethers, ketones and aliphatic and aromatic hydrocarbon solvents that are conventionally used.

In one particularly preferred primer composition, the binder contains about 35-45% by weight, based on the weight of the binder, of a hydroxyl containing polyester copolymer having a hydroxyl number of about 100-300 and a number average molecular weight of about 300-3,000 and being the esterification product of neopentyl glycol, trimethylolpropane, dimethyl cyclohexyl dicarboxylate, adipic acid and isophthalic acid; 5-20% by weight, based on the weight of the binder, of castor oil, and 40-50 % by weight, based on the weight of the binder of a monomeric fully alkylated melamine formaldehyde crosslinking agent which is methylated and butylated in a 1:1 molar ratio. The composition forms a hard cured coating on a substrate having excellent adhesion to the substrate and forms a smooth finish to which conventional topcoats can be applied.

The composition can contain about 0.01-2% by weight, based on the weight of the binder, of ultraviolet light stabilizers which term includes ultraviolet light absorbers, screeners and quenchers. Typical ultraviolet light stablizers include benzophenones, triazines, triazols, benzoates, hindered amines and blends of thereof.

The primer composition can be applied to a plastic or metal substrate by conventional techniques such as spraying, electrostatic spraying, dipping, brushing, flowcoating and the like. As mentioned above the preferred method is electrostatic spraying. After application, the composition is baked at about 120°-200° C. for about 5-45 minutes to form a primer coating layer about 0.1-2.0 mils thick. Generally the primer layer is about 0.5-1.5 mils thick.

To achieve an adequate cure of the composition, a blocked acid catalyst is added to the composition in amounts of about 0.1-6.0% by weight of the binder. Typically useful blocked acid catalysts are aromatic sulfonic acids blocked with amino methyl propanol or dimethyl oxazoline. Typically useful aromatic sulfonic acids are paral toluene sulfonic acid, dodecyl benzene sulfonic acid, decyl benzene sulfonic acid. One preferred catalyst is dodecyl benzene sulfonic acid blocked with amino methyl propanol.

Conventional solvent based or water based acrylic enamels or lacquers, acrylic polyurethane coatings, polyesterurethane coatings, alkyd enamels and the like can be applied by electrostatic spraying over the primer and then baked to form a durable automotive or truck finish.

The following example illustrates the invention. All parts and percentages are on a weight basis unless otherwise indicated. Molecular weights are determined by gel permeation chromatography using polymethyl methacrylate as the standard.

EXAMPLE 1

A primer composition is prepared by first forming a mill base and then mixing the mill base with the components of the primer composition.

| Gray Mill Base | Parts By Weight |
|---|---|
| Portion 1 | |
| Polyester resin solution (80% resins solids in methyl amyl ketone of a polyester resin of neopentyl glycol, trimethylolpropane, dimethyl cyclohexyl dicarboxylate, adipic acid and isophthalic acid in a weight ratio of 37.9/8.6/22.8/5.5/25.2 having an acid number of about 10-15 and a hydroxyl no. of 170-190 and a Gardner Holdt visc. of Z-$Z_2$ and an Mn of 1500) | 20.00 |
| Castor Oil | 2.00 |
| "Resimine" 755 (fully butlylated and methylated in a 1:1 molar ratio monomeric melamine formalehyde crosslinking agent) | 9.00 |
| Methyl amyl ketone | 20.55 |
| Portion 2 | |
| Titanium dioxide pigment | 45.74 |
| Carbon black pigment (Vulcan XC-72-R Furnace Black pigment without a surface treatment) | 2.71 |
| Total | 100.00 |

The above constituents are charged into a conventional sand mill and ground to a fineness of 0.5 mils.

A primer was prepared by blending together the following constituents:

| | Parts by Weight |
|---|---|
| Gray Mill Base (prepared above) | 743.82 |
| Polyester resin solution (described above) | 91.91 |
| Castor oil | 57.26 |
| "Resimine" 755 (described above) | 149.66 |
| Flow and leveling agent (1% Silicone oil solution in butyl acetate) | 2.90 |
| Blocked acid catalyst solution (53% solids dodecylbenzene sulfonic acid blocked with dimethyloxazolidine in methanol) | 14.44 |
| Methyl amyl ketone | 27.62 |
| Total | 1087.61 |

The resulting primer composition has a solids content of 78%, a pigment/binder ratio of 42/100 and is gray in color.

The primer was reduced to a spray viscosity of 35" measured with a No. 2 Fisher cup at 25° C. with methyl amyl ketone and sprayed onto a cold roll steel panel, a phosphatized steel panel, a fiber glass reinforced polyester panel, a reaction injection molded urethane panel and a partially crystalline polyamide panel. The steel panels were baked for 30 minutes at about 125° C. and the remaining panels were baked at 120° C. for about 30 minutes. The panels had had a gray color, a dry film thickness of about 0.8 mils and a gloss measured at 60° C. of about 30.

The coatings on the panels had the following properties:

```
mar resistance - good
adhesion - good
sandability - good
knife scrape resistance - good
solvent resistance - >50 double rubs
(1:1 ratio p-naphtha/isopropanol)
humidity resistance
96 hour at 38° C./100% rel. humidity - 10¹
dry crosshatch and tape adhesion - 10¹
chip resistance - gravelometer - 9¹
```

Rating system
[1] 0–10, 10 - best, 0 - worst
[2] 0–5, 5 - best, 0 - worst

EXAMPLE 2

A gray surfacer was prepared by forming a gray mill base and then formulating the surfacer.

| Gray Mill Base (32-8944) | Parts By Weight |
|---|---|
| Portion 1 | |
| Polyester resin solution (described in Example 1) | 20.00 |
| "Resimine" 755 (described in Example 1) | 5.00 |
| Butyl acetate | 8.00 |
| Xylene | 2.00 |
| Portion 2 | |
| Titanium dioxide pigment | 64.86 |
| Carbon black pigment (described in Example 1) | 0.14 |
| Total | 100.00 |

The above constitutents are charged into a conventional sand mill and ground to a fineness of 0.5 mils.

| (764-171) | Parts by Weight |
|---|---|
| Portion 1 | |
| Gray Mill Base (prepared above) | 370.45 |
| Silicone oil solution (1% solution) | 3.61 |
| Blocked acid catalyst solution (53% solids dodecylbenzene sulfonic acid blocked with dimethyloxazolidine in methanol) | 4.31 |
| Portion 2 | |
| Polyester resin solution (described above) | 226.81 |
| Castor oil | 90.26 |
| "Resimine" 755 (described in Example 1) | 237.82 |
| Fumed Silica dispersion (8.9% silica in a melamine resin solution) | 29.01 |
| Portion 3 | |
| Butanol | 36.11 |
| Polyvinyl pyrrolidone anti-sag agent (3% in butynol) | 5.42 |
| Portion 4 | |
| Xylene | 12.04 |
| (764-171) | Parts by Weight |
| Methyl ethyl ketone | 21.66 |
| Total | 1037.50 |

The resulting surfacer has a solids content of 82%, a pigment/binder ratio of 42/100 and is light gray in color.

The primer was reduced to a spray viscosity of 35" measured with a No.2 Fisher cup at 25° C. with methyl ethyl ketone and sprayed onto a cold roll steel panel, a primed and phosphatized steel panel, a fiber glass reinforced polyester panel, a reaction injection molded urethane panel and a partially crystalline polyamide panel. The steel panels were baked for 30 minutes at about 150° C. and the remaining panels were baked at 120° C. for about 30 minutes. The acid catalyst level was increased by a factor of 3 at the 120° C. bake. The panels had had a gray color, a dry film thickness of about 0.8 mils and a gloss measured at 60° C. of about 50.

The coatings on the panels had the following properties:

```
adhesion - good
sandability - good
knife scrape resistance - good
solvent resistance - >50 double rubs
(1:1 ratio p-naphtha/isopropanol)
humidity resistance
96 hour at 38° C./100% rel. humidity - 10¹
dry crosshatch and tape adhesion - 10¹
chip resistance - gravelometer - 10¹
```

Rating system
[1] 0–10, 10 - best, 0 - worst
[2] 0–5, 5 - best, 0 - worst

What is claimed is:

1. A primer composition comprising solvents and about 50–85% by weight of a film forming binder and pigments in a pigment to binder weight ratio of about 1:100–150:100; and the binder consists essentially of about
   (1) 30–65% by weight, based on the weight of the binder, of a hydroxyl containing polyester copolymer having a hydroxyl number of about 100–300 and a number average molecular weight of about 300–3,000 and being the esterification product of an alkylene glycol, a branched chain polyol, a cycloaliphatic dicarboxylic acid, an aliphatic dicarboxylic acid and an aromatic dicarboxylic acid or anhydride thereof;
   (2) 5–20% by weight, based on the weight of the binder, of a reactive plasticizer selected from the group consisting of castor oil and polycaprolactone; and
   (3) 30–50 % by weight, based on the weight of the binder, of a monomeric fully alkylated melamine formaldehyde crosslinking agent.

2. The primer composition of claim 1 in which the the polyester comprises the esterification product of neopentyl glycol, trimethylolpropane, dimethyl cyclohexyl dicarboxylate, adipic acid and isophthalic acid.

3. The primer composition of claim 1 in which the fully alkylated melamine formaldehyde crosslinking agent is a monomeric butylated and methylated melamine formaldehyde, butylated and methylated in a 1:1 molar ratio.

4. The primer composition of claim 1 wherein the binder consists essentially of about
   (1) 35-45% by weight, based on the weight of the binder, of a hydroxyl containing polyester copolymer having a hydroxyl number of about 100-300 and a number average molecular weight of about 300-3,000 and being the esterification product of neopentyl glycol, trimethylol propane, dimethyl cyclohexyl dicarboxylate, adipic acid and isophthalic acid;
   (2) 5-20% by weight, based on the weight of the binder, of castor oil, and
   (3) 40-50% by weight, based on the weight of the binder of a monomeric fully alkylated melamine formaldehyde crosslinking agent which is methylated and butylated in a 1:1 molar ratio.

5. The primer composition of claim 1 containing in addition about 0.1-6% by weight, based on the weight of the binder, of a blocked acid catalyst.

6. The primer composition of claim 5 in which the acid catalyst is an aromatic sulfonic acid catalyst.

7. A substrate coated with a dried and cured layer of the composition of claim 1.

8. The substrate of claim 7 in which the substrate is a metal.

9. The substrate of claim 7 in which the substrate is a plastic.

10. The substrate of claim 7 in which the substrate is a plastic reinforced with fiberglass.

* * * * *